United States Patent
Sahasrabudhe et al.

(10) Patent No.: US 10,437,261 B2
(45) Date of Patent: Oct. 8, 2019

(54) FORMATION FLYING METHOD AND SYSTEM

(75) Inventors: Vineet Sahasrabudhe, Cheshire, CT (US); Stella Jang, Derby, CT (US); Matthew A. White, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1086 days.

(21) Appl. No.: 13/172,342

(22) Filed: Jun. 29, 2011

(65) Prior Publication Data

US 2012/0004844 A1  Jan. 5, 2012

Related U.S. Application Data

(60) Provisional application No. 61/360,671, filed on Jul. 1, 2010.

(51) Int. Cl.
*G05D 1/10* (2006.01)
*G05D 1/00* (2006.01)
(Continued)

(52) U.S. Cl.
CPC ............ *G05D 1/104* (2013.01); *G05D 1/00* (2013.01); *G05D 1/0011* (2013.01); *G05D 1/0022* (2013.01); *G05D 1/0033* (2013.01); *G05D 1/0038* (2013.01); *G05D 1/027* (2013.01); *G05D 1/10* (2013.01); *G05D 1/101* (2013.01); *G08G 5/0047* (2013.01); *G08G 5/0069* (2013.01); *G08G 5/04* (2013.01)

(58) Field of Classification Search
CPC ...... G05D 1/00; G05D 1/0011; G05D 1/0022; G05D 1/0027; G05D 1/0033; G05D 1/0038; G05D 1/10; G05D 1/101; G05D 1/104; G05D 1/027; G08G 5/008; G08G 5/0047; G08G 5/0069; G08G 5/04; G08D 5/008
USPC ...... 701/300, 302, 494, 495, 517, 519, 4, 11
See application file for complete search history.

(56) References Cited

U.S. PATENT DOCUMENTS 5,043,903 A  *  8/1991  Constant ................ G05D 1/104
                                                      342/31
5,521,817 A  *  5/1996  Burdoin ................ G05D 1/0027
                                                      244/190

(Continued)

FOREIGN PATENT DOCUMENTS

WO        2009045109 A1     4/2009

OTHER PUBLICATIONS

Gu et al., Design and Flight Testing Evaluation of Formation Control Laws, Nov. 2006, IEEE Transactions on Control Systems Technology, vol. 14, No. 6, pp. 1105-1112 (Year: 2006).*

(Continued)

*Primary Examiner* — Sze-Hon Kong
(74) *Attorney, Agent, or Firm* — Cantor Colburn LLP

(57) ABSTRACT

A method for directing formation flying of an aircraft includes sensing a relative position of a leader to a follower aircraft by one or more sensors disposed at the follower aircraft. The relative position is compared to a selected relative position, and a follower velocity of the follower aircraft necessary to move the follower aircraft to the selective relative position is determined via a flight control computer of the follower aircraft. The follower velocity is transformed into flight control inputs and the follower aircraft is moved to the selected relative position via the flight control inputs.

18 Claims, 3 Drawing Sheets

(51) Int. Cl.
*G08G 5/00* (2006.01)
*G05D 1/02* (2006.01)
*G08G 5/04* (2006.01)

(56) References Cited

U.S. PATENT DOCUMENTS

| | | | | |
|---|---|---|---|---|
| 5,581,250 | A * | 12/1996 | Khvilivitzky | G01S 11/12 340/945 |
| 5,906,336 | A * | 5/1999 | Eckstein | B64C 39/024 244/135 A |
| 6,262,679 | B1 * | 7/2001 | Tran | G01S 13/9303 342/29 |
| 6,871,816 | B2 * | 3/2005 | Nugent | B64C 13/16 244/3.15 |
| 6,889,941 | B1 * | 5/2005 | McElreath | B64D 39/00 244/135 A |
| 6,963,795 | B2 * | 11/2005 | Haissig et al. | 701/7 |
| 7,272,472 | B1 * | 9/2007 | McElreath | G01S 5/0289 701/3 |
| 7,505,609 | B1 * | 3/2009 | Hartman | G06K 9/3208 382/103 |
| 7,636,619 | B2 * | 12/2009 | Winkler | G05D 1/104 340/992 |
| 7,761,235 | B2 * | 7/2010 | Winkler | G05D 1/104 342/29 |
| 8,219,264 | B1 * | 7/2012 | Blake | B64D 39/00 701/3 |
| 8,386,158 | B2 * | 2/2013 | Blanchon | G05D 1/104 340/439 |
| 2002/0069019 | A1 * | 6/2002 | Lin | G05D 1/0055 701/301 |
| 2002/0183900 | A1 * | 12/2002 | Sainthuile | G08G 5/0008 701/4 |
| 2004/0068416 | A1 * | 4/2004 | Solomon | F41H 13/00 446/454 |
| 2005/0055143 | A1 * | 3/2005 | Doane | B64C 13/18 701/301 |
| 2005/0165516 | A1 * | 7/2005 | Haissig | G08G 5/0008 701/4 |
| 2005/0230563 | A1 * | 10/2005 | Corcoran, III | B64C 13/20 244/175 |
| 2006/0167596 | A1 * | 7/2006 | Bodin | G05D 1/0027 701/3 |
| 2007/0093945 | A1 * | 4/2007 | Grzywna | G05D 1/101 701/23 |
| 2007/0168090 | A1 * | 7/2007 | DeMarco | G05D 1/104 701/23 |
| 2007/0203649 | A1 * | 8/2007 | Winkler | G05D 1/104 701/301 |
| 2007/0233337 | A1 * | 10/2007 | Plishner | G05D 1/0295 701/23 |
| 2007/0288101 | A1 * | 12/2007 | Liu | G05B 13/024 700/19 |
| 2008/0039987 | A1 * | 2/2008 | Winkler | G05D 1/104 701/4 |
| 2008/0071431 | A1 * | 3/2008 | Dockter | B63B 35/50 701/3 |
| 2008/0085686 | A1 * | 4/2008 | Kalik | G01S 13/931 455/154.1 |
| 2008/0243383 | A1 * | 10/2008 | Lin | G01C 21/165 701/469 |
| 2009/0045290 | A1 * | 2/2009 | Small | B64C 39/024 244/135 A |
| 2009/0118875 | A1 * | 5/2009 | Stroud | G01S 5/0027 701/3 |
| 2009/0232387 | A1 * | 9/2009 | Gulati | H04N 5/247 382/154 |
| 2010/0017046 | A1 * | 1/2010 | Cheung | G01S 7/003 701/2 |
| 2010/0206995 | A1 * | 8/2010 | Inada | G05D 1/104 244/76 R |
| 2010/0292871 | A1 * | 11/2010 | Schultz et al. | 701/3 |
| 2010/0332066 | A1 * | 12/2010 | Calise | G05D 1/0204 701/23 |
| 2011/0035149 | A1 * | 2/2011 | McAndrew | G05D 1/0038 701/466 |
| 2011/0066360 | A1 * | 3/2011 | Haissig | 701/116 |
| 2011/0110579 | A1 * | 5/2011 | Walford | G01C 11/02 382/154 |
| 2011/0122257 | A1 * | 5/2011 | Kirk | G01C 11/06 348/187 |
| 2011/0134249 | A1 * | 6/2011 | Wood | G01C 3/08 348/164 |
| 2011/0169946 | A1 * | 7/2011 | Rudin | G01S 5/16 348/135 |
| 2011/0178658 | A1 * | 7/2011 | Kotaba | G01C 21/005 701/3 |
| 2011/0301925 | A1 * | 12/2011 | McWilliams, III | G09B 9/48 703/6 |
| 2012/0199698 | A1 * | 8/2012 | Thomasson | B64C 39/024 244/175 |
| 2014/0195150 | A1 * | 7/2014 | Rios | B64C 39/024 701/469 |
| 2014/0200744 | A1 * | 7/2014 | Molander | G05D 1/101 701/2 |

OTHER PUBLICATIONS

Pachter et al., Tight Formation Flight Control, Mar.-Apr. 2001, Journal of Guidance, Control, and Dynamics, vol. 24, No. 2, pp. 246-254 (Year: 2001).*
Kim et al. Three Dimensional Optimum Controller for Multiple UAV Formation Flight Using Behavior-based Decentralized Approach, Oct. 17-20, 2007, International Conference on Control, Automation and Systems 2007, pp. 1387-1392 (Year: 2007).*
Anderson et al., UAV Formation Control: Theory and Application, V.D. Blondel et al. (Eds.) Recent Advances in Learning and Control, LNCIS 371, Springer, pp. 15-33, 2008 (Year: 2008).*
Liu et al., Adaptive Synchronized Attitude Angular Velocity Tracking Control of Multi-UAVs, Jun. 8-10, 2005, 2005 American Control Conference, pp. 128-133 (Year: 2005).*
Dong et al., Implementation of Formation Flight of Multiple Unmanned Aerial Vehicles, Jun. 9-11, 2010, 2010 8th IEEE International Conference on Control and Automation, pp. 904-909 (Year: 2010).*
EP 11 17 2358 European Search Report dated Nov. 17, 2017; 7 pages.

* cited by examiner

FORMATION FLYING METHOD AND SYSTEM

CROSS-REFERENCES TO RELATED APPLICATIONS

This patent application claims priority to U.S. Provisional Patent Application Ser. No. 61/360,671 filed Jul. 1, 2010, which is incorporated herein by reference in its entirety.

BACKGROUND OF THE INVENTION

The subject matter disclosed herein relates to flight control. More specifically, the subject disclosure relates to systems and methods for control of formation flying of aircraft.

Formation flying of aircraft is a high pilot-workload activity where one or more follower aircraft attempt to maintain a desired position relative to a designated lead aircraft. Systems have been developed in an attempt to ease workload on the pilot, including systems in which there is communication between the lead aircraft and the follower aircraft. For example, the lead aircraft may be modified to emit a signal that is tracked and followed by the follower aircraft.

BRIEF DESCRIPTION OF THE INVENTION

According to one aspect of the invention, a method for directing formation flying of an aircraft includes sensing a relative position of a leader to a follower aircraft by one or more sensors disposed at the follower aircraft. The relative position is compared to a selected relative position, and a follower velocity of the follower aircraft necessary to move the follower aircraft to the selective relative position is determined via a flight control computer of the follower aircraft. The follower velocity is transformed into flight control inputs and the follower aircraft is moved to the selected relative position via the flight control inputs.

According to another aspect of the invention, a system for directing formation flying of aircraft includes one or more sensors located at a follower aircraft, the one or more sensors configured to detect data regarding a position of the follower aircraft relative to a position of a leader. A flight control computer is located at the follower aircraft and is in operable communication with the one or more sensors. The flight control computer is configured to determine a relative position between the follower aircraft and the leader, compare the relative position to a selected relative position, determine a follower velocity of the follower aircraft necessary to move the follower aircraft to the selected relative position, transform the follower velocity into flight control inputs, and direct movement of the follower aircraft to the selected relative position via the flight control inputs. These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
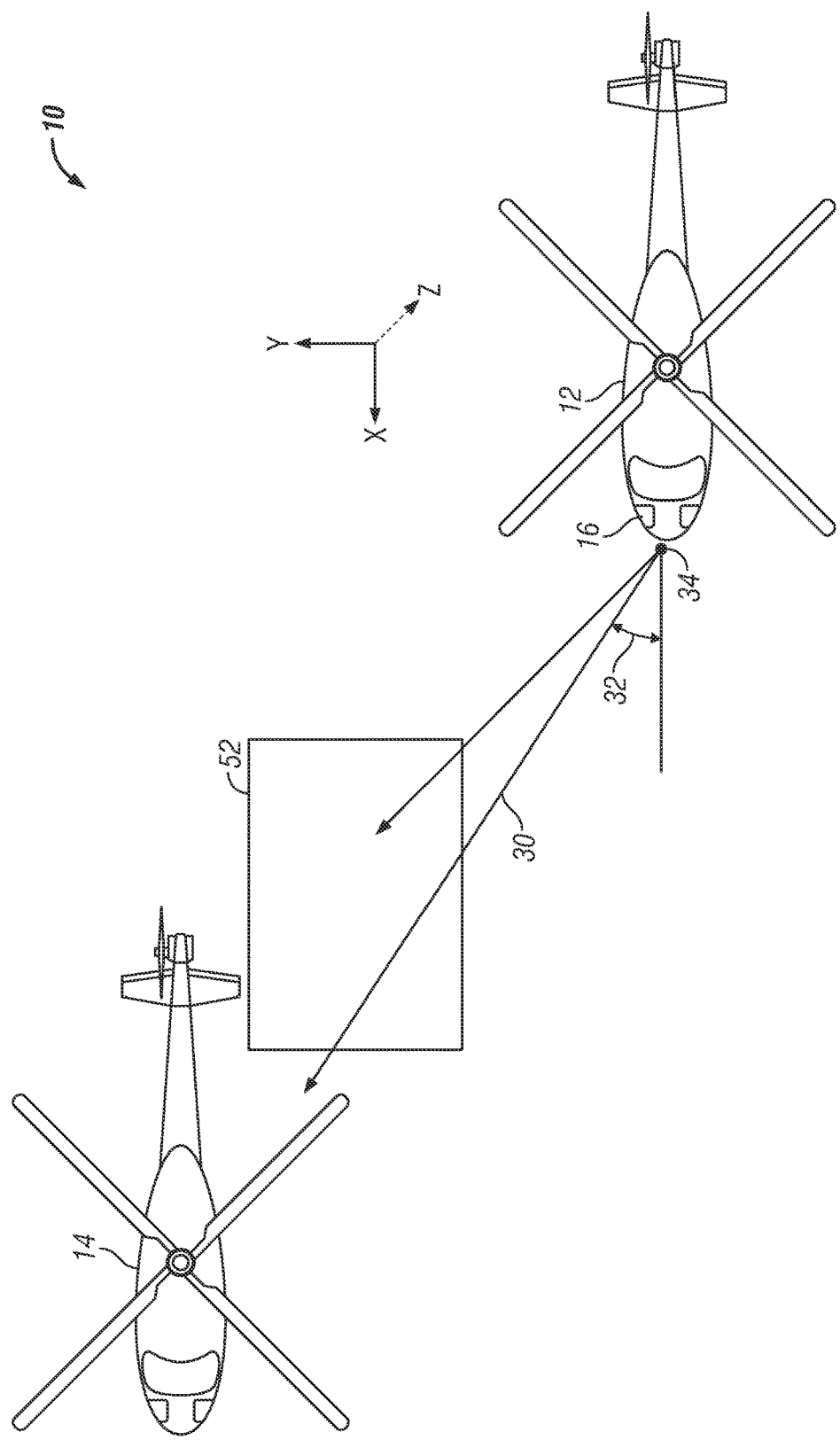
FIG. 1 is a schematic view of an embodiment of formation flying of aircraft.

Shown in FIG. 1 is schematic representation of a self-contained, autonomous formation flying system 10. Referring to FIG. 1, the system 10 controls a position of a follower aircraft 12, for example, a helicopter, to a leader. In the embodiment shown in FIG. 1, the leader is a lead aircraft 14, but in other embodiments the leader may be another moving object, for example, a ground vehicle, a sea vehicle, or a refueling drogue.

The follower aircraft 12 includes one or more passive sensors 16. The sensors 16 of FIG. 1 are imaging sensors, specifically cameras. In other embodiments, the sensors 16 may be infared sensors, radar, sonar, lidar, global positioning sensors, or the like, or a combination of different types of sensors 16. Further, the sensors 16 may be sensors 16 already present at the follower aircraft 12 and not specifically utilized solely for the purposes described herein. For example, sensors 16 utilized may include: sandblaster sensors utilized to aide navigation through airborne particles such as sand and dust, missile detection sensors which in some cases are thermal-sensitive sensors, small arms fire sensors which in some cases are acoustic sensors, wire detection sensors, collision avoidance sensors, auto-land sensors, terrain following sensors, waypoint following sensors, or external load detection and pickup sensors.

Figure 2:
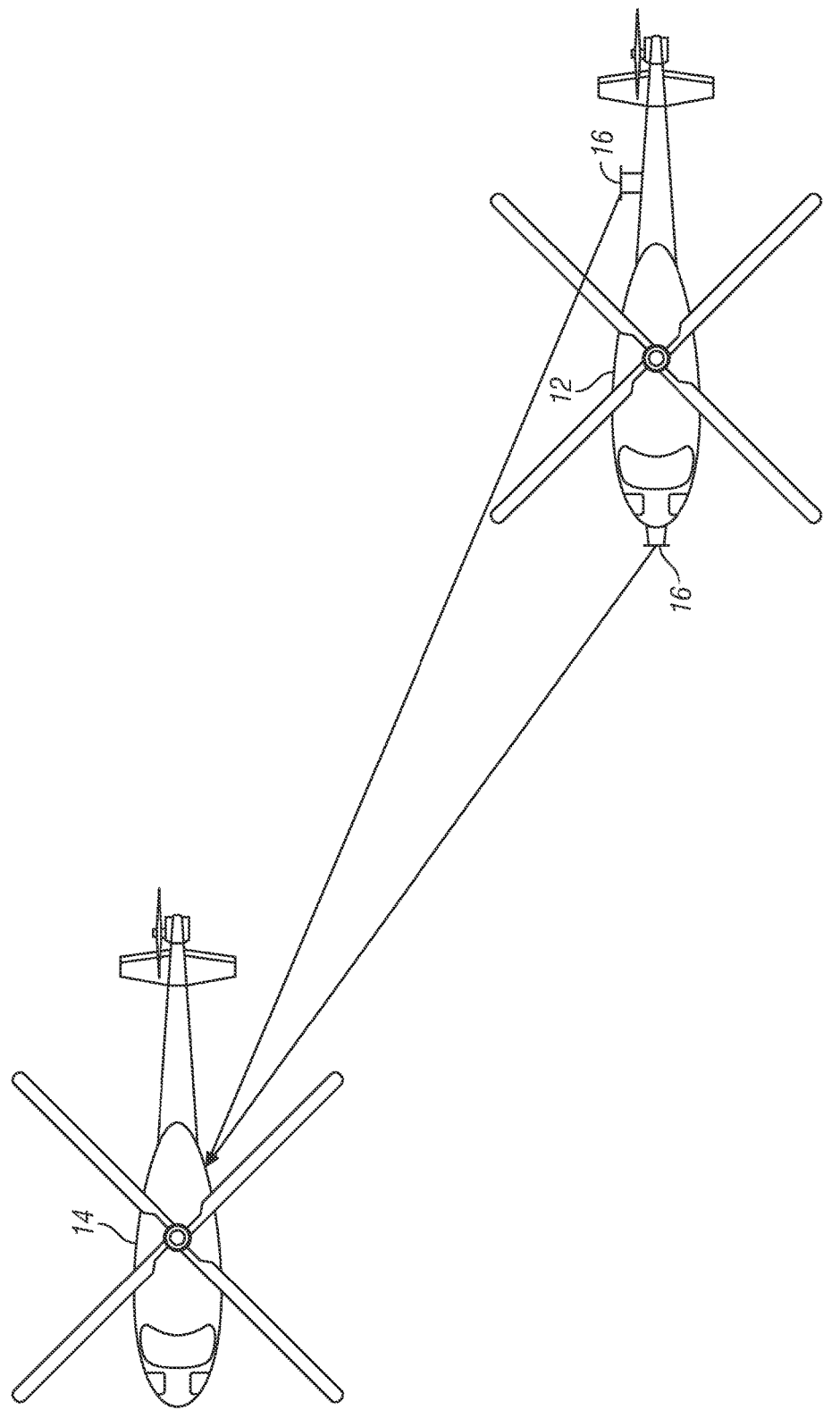
FIG. 2 is a schematic view of another embodiment of formation flying of aircraft.

The sensors 16 at the follower aircraft 12 obtain a relative position of the lead aircraft 14. To obtain an accurate relative position, in some embodiments it is advantageous to obtain information from more than one sensor 16 at the follower aircraft 12. Further, as shown in FIG. 2, to increase the accuracy of triangulation, it is advantageous to position the sensors 16 at points as far apart as possible at the follower aircraft 12, for example, a sensor 16 at or near a nose of the follower aircraft 12 and another sensor 16 at or near a tail of the follower aircraft 12. This arrangement is particularly advantageous with certain types of sensors 16, for example, cameras. It increases a ratio of distance between the cameras to the distance between the aircraft 12, 14, thus resulting in a more accurate determination of a distance between the aircraft 12, 14.

Figure 3:
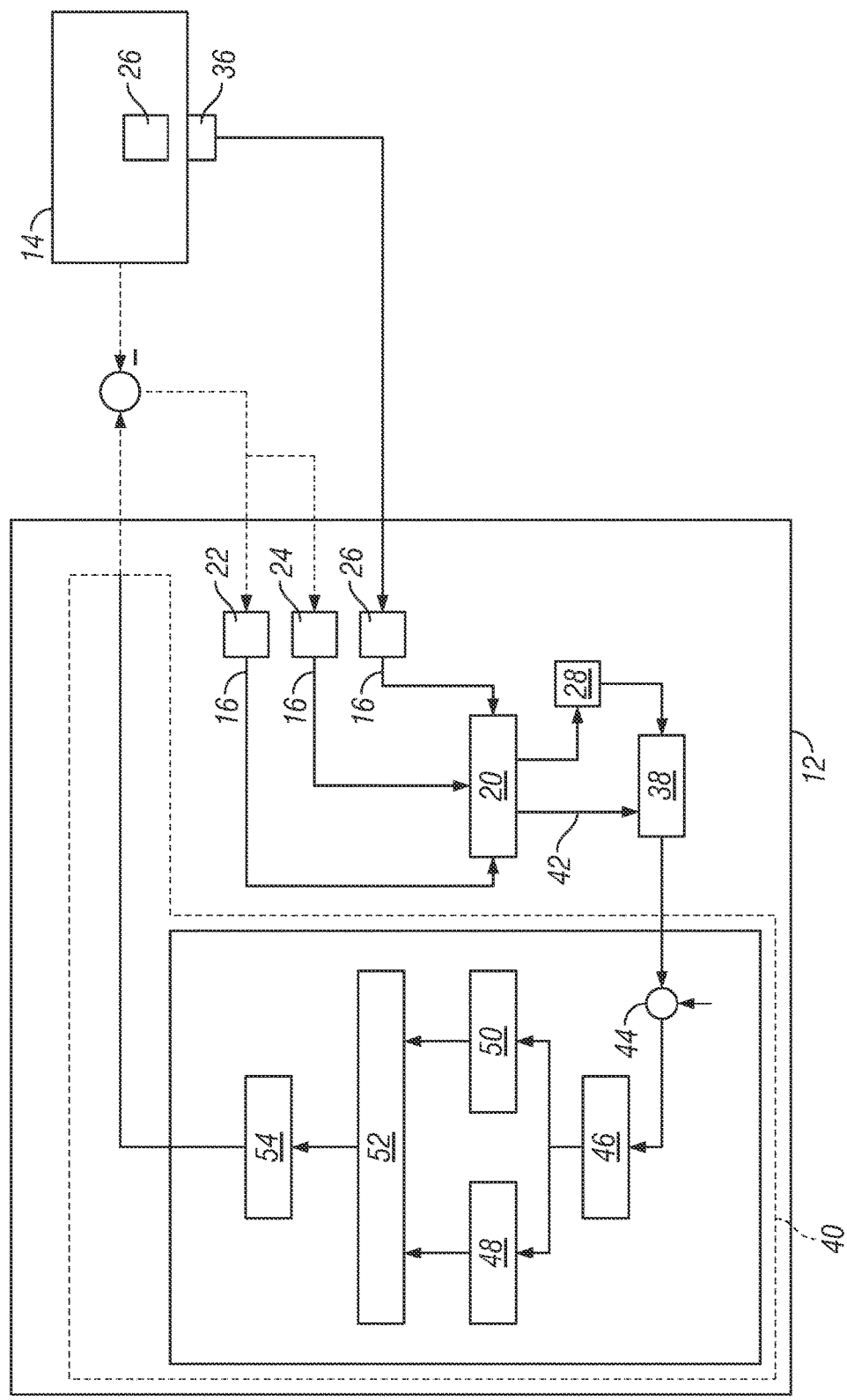
FIG. 3 is a schematic view of an embodiment of a method and system for controlling formation flying of aircraft.

The follower aircraft 12 further includes a control system 18, shown schematically in FIG. 3. The control system 18 includes a sensor fusion computer 20 that collects data from the sensors 16 and converts sensor data obtained of the lead aircraft 14 into an estimate of a position of the lead aircraft 14 relative to the follower aircraft 12. In embodiments where the sensors 16 are cameras, for example, the sensor fusion computer 20 is an image processor that converts video images of the lead aircraft 14 obtained by the cameras into the relative position.

In other embodiments, as stated above, a combination of sensor 16 types may be used. For example, some embodiments utilize a combination of video sensors 22, radar sensors 24 and global positioning sensors 26 located at the follower aircraft 12. The sensor fusion computer 20 receives visual data from the video sensors 22 and runs a visual tracking algorithm 28 to process the visual data into an estimate of relative range 30, azimuth 32, and elevation 34 (shown in FIG. 1) between the lead aircraft 14 and the follower aircraft 12. Radar sensors 24 provide relative range 30 and azimuth 32 data to the sensor fusion computer 20. Further, radar sensors 24 can track more than one target, for example, more than one lead aircraft 14. Inclusion of multiple radar sensors 24 can provide elevation 34 as well as range 30 and azimuth 32.

Relative global positioning data and sensor data, in the form of range 30, azimuth 32 and elevation 34 is provided to the sensor fusion computer 20. Relative global positioning requires an additional global positioning sensor 26 and a datalink device 36 at the lead aircraft 14. Global positioning coordinates of the lead aircraft 14 are obtained and transmitted to the follower aircraft 12, where the relative position of the follower aircraft 12 is determined by comparing the data from the lead aircraft 14 global positioning sensor 26 to the data from the follower aircraft 12 global positioning sensor 26. A relative position 42 obtained via the various sensors is communicated through an avionics bus 38, such as a MIL-STD-1553 bus, to a flight control computer 40 of the follower aircraft 12.

The relative position 42 is compared to a selected relative position 44 at the flight control computer 40. A determination is made by the flight control computer of a magnitude of an error 46 between the relative position 42 and the selected relative position 44 and it is determined whether high gain corrective measures 48 or relatively low gain corrective measures 50 are necessary to move the follower aircraft 12 such that the relative position 44 is within an acceptable range. The necessary correction is determined and transformed into body-axis velocities $v_x$, $v_y$, and $v_z$ relative to the three body axes of the follower aircraft 12.

To physically change the direction of the follower aircraft 12, the flight control computer 40 converts the body and inertial axis velocities $v_x$, $v_y$, and $v_z$ into pilot path inputs. The flight control computer 40 communicates the body axis velocities to controls in the follower aircraft 12 which may include, but are not limited to, controls for the roll stick, pitch stick, pedals, and/or throttle or collective stick. Through these inputs, the flight control computer 40 directs the follower aircraft 12 into a desired position envelope 52. The self-contained autonomous formation flying system 10 described herein is self-contained to each follower aircraft 12. Further, the formation flying system 10 is autonomous, requiring no communication between the follower aircraft 12 and the lead aircraft 14, or between the follower aircraft 12 and a ground station for direction of the formation flying.

The system 10 includes safety features to avoid overaggressive inputs to change the path of the follower aircraft 12 and also means for the pilot to disengage the system if necessary. For example, in cases where the relative position 44 is a great distance away from the selected relative position 46, the flight control computer 40 might prescribe harsh corrections to the path of the follower aircraft 12 to return the follower aircraft 12 to the desired position envelope. Such harsh corrections, however, might endanger the aircraft, its crew and/or other aircraft and their crew, and/or exceed ride comfort limits of the follower aircraft 12. For this reason, the intended corrections are compared to limits at a correction limiter 54, which then limits the amount of correction available, limits specific commands such as roll, pitch, etc., and also limits the rate of such commands to preserve safety of the aircraft and nearby aircraft.

Further, the system 10 includes means for the system 10 to be disengaged. Such means may include a pilot input to a control stick of the aircraft 12, a button or switch which is activated by the pilot. Further, if the flight control system 40 determines that the path of the lead aircraft 14 is unsafe to follow, the flight control system 10 will disengage the formation flying system 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for directing formation flying of an aircraft comprising:
   determining a position of a leader vehicle by one or more sensors disposed at a follower aircraft, the one or more sensors including at least one of a video sensor, a radar sensor, an infrared sensor, a sonar sensor, and a LIDAR sensor;
   converting images captured by at least one of the one or more sensors into a real time estimate of position including azimuth, distance, and elevation in a sensor fusion computer in the follower aircraft;
   determining a relative position, between the leader vehicle and the follower aircraft at the follower aircraft based on the one or more sensors at the follower aircraft including the estimate of position from the sensor fusion computer;
   comparing the relative position to a selected relative position;
   determining a follower velocity of the follower aircraft necessary to move the follower aircraft to the selected relative position between the leader vehicle and the follower aircraft via a flight control computer of the follower aircraft;
   transforming the follower velocity into flight control inputs in the follower aircraft;
   determining a magnitude of an error between the relative position and the selected relative position;
   determining whether high gain corrective flight control inputs or low gain corrective flight control inputs needed to move the aircraft into the selected relative position;
   moving the follower aircraft to maintain the selected relative position via one of the high gain corrective flight control inputs and the low gain corrective flight control inputs;
   transmitting data collected from the one or more sensors at the follower aircraft to the sensor fusion computer to determine the relative position of the follower aircraft to the leader vehicle;
   determining that a path of the leader vehicle is unsafe for the follower aircraft to follow; and
   disengaging formation flying via the flight control computer when it is unsafe for the follower aircraft to follow the leader vehicle.

2. The method of claim 1, further comprising:
sensing a global position of the leader via a global position sensor disposed at the leader vehicle; and
transmitting the global position of the leader vehicle to the follower aircraft.

3. The method of claim 2, wherein determining the relative position between the leader vehicle and the follower aircraft includes determining the relative position based on the global position of the leader vehicle transmitted to the follower aircraft and at least one other sensor disposed at the follower aircraft.

4. The method of claim 1, wherein at least one sensor of the one or more sensors is a video sensor.

5. The method of claim 4, wherein at least two sensors are video sensors.

6. The method of claim 5, wherein the relative position is determined via triangulation.

7. The method of claim 1, wherein converting the images from the video sensor into the relative position includes utilizing a visual tracking algorithm.

8. The method of claim 1, further comprising limiting movement of the follower aircraft relative to the leader vehicle to preserve safety of the follower aircraft.

9. The method of claim 1, further comprising disengaging formation flying.

10. The method of claim 9, wherein the disengagement is via one of a pilot input to a flight control, a pilot activation of a control button or switch, or independent action of the flight control computer.

11. The method of claim 1 wherein the leader vehicle is a lead aircraft.

12. A system for directing formation flying of aircraft comprising:
one or more sensors disposed at a follower aircraft, the one or more sensors configured to determine a position of a leader vehicle, the one or more sensors including at least one of a video sensor, a radar sensor, an infrared sensor, a sonar sensor, and a LIDAR sensor;
a flight control computer disposed at the follower aircraft and in operable communication with the one or more sensors, the flight control computer configured to:
convert images captured by at least one of the one or more sensors into a real time estimate of position including azimuth, distance, and elevation in a sensor fusion computer in the follower aircraft;
determine a relative position between the follower aircraft and the leader vehicle based on the one or more sensors at the follower aircraft including the real time estimate of position from the sensor fusion computer;
compare the relative position to a selected relative position;
determine a follower velocity of the follower aircraft necessary to move the follower aircraft to the selected relative position;
transform the follower velocity into flight control inputs in the follower aircraft;
determine a magnitude of an error between the relative position and the selected relative position;
determine whether high gain corrective flight control inputs or low gain corrective flight control inputs are needed to move the aircraft into the selected relative position;
direct movement of the follower aircraft to maintain the selected relative position via one of the high gain corrective flight control inputs and the low gain corrective flight control inputs;
transmit data collected from the one or more sensors at the follower aircraft to the sensor fusion computer to determine the relative position of the follower aircraft to the leader vehicle;
determine that a path of the leader vehicle is unsafe for the follower aircraft to follow; and
disengage formation flying via the flight control computer when it is unsafe for the follower aircraft to follow the leader vehicle.

13. The system of claim 12, further comprising a datalink disposed at the follower aircraft to receive global position data of the leader vehicle.

14. The system of claim 12, wherein at least one sensor of the one or more sensors is a video sensor.

15. The system of claim 14, wherein the flight control computer is configured to convert images from the video sensor into the relative position.

16. The system of claim 14, wherein at least two sensors are video sensors.

17. A system for directing formation flying of aircraft comprising:
two or more cameras disposed at a follower aircraft, a first camera of the two or more cameras disposed at a nose of the follower aircraft and a second camera of the two or more cameras disposed at a tail of the aircraft, the two or more cameras configured to detect a position of a leader vehicle;
a flight control computer disposed at the follower aircraft and in operable communication with the two or more cameras, the flight control computer configured to:
convert images from the one or more cameras into a real time estimate of relative position including azimuth, distance, and elevation, between the follower aircraft and the leader vehicle in a sensor fusion computer in the follower aircraft;
compare the real time estimate of relative position to a selected relative position within a selected position envelope;
determine a follower velocity of the follower aircraft necessary to move the follower aircraft to maintain the selected relative position;
transform the follower velocity into flight control inputs in the follower aircraft; determine a magnitude of an error between the relative position and the selected relative position;
determine whether high gain corrective flight control inputs or low gain corrective flight control inputs are needed to move the aircraft into the selected relative position;
direct movement of the follower aircraft to maintain the selected relative position via one of the high gain corrective flight control inputs and the low gain corrective flight control inputs;
determine that a path of the leader vehicle is unsafe for the follower aircraft to follow; and
disengage formation flying via the flight control computer when it is unsafe for the follower aircraft to follow the leader vehicle.

18. A method for directing formation flying of an aircraft comprising:
determining a position of a leader vehicle with a plurality of sensors disposed at a follower aircraft, the plurality of sensors including a video sensor, a radar sensor, an infrared sensor, a sonar sensor, and a LIDAR sensor;
converting images captured by at least two of the plurality of sensors into a real time estimate of position including azimuth, distance, and elevation in a sensor fusion computer in the follower aircraft;

determining a relative position, between the leader vehicle and the follower aircraft at the follower aircraft without receiving data from a ground station based on the real time estimate of position from the sensor fusion computer;

comparing the relative position to a selected relative position;

determining a follower velocity of the follower aircraft necessary to move the follower aircraft to the selected relative position between the leader vehicle and the follower aircraft via a flight control computer of the follower aircraft;

transforming the follower velocity into flight control inputs;

determining a magnitude of an error between the relative position and the selected relative position;

determining whether high gain corrective flight control inputs or low gain corrective flight control inputs needed to move the aircraft into the selected relative position;

changing a direction of the follower aircraft through one of the high gain corrective flight control inputs and the low gain corrective flight control inputs by converting body axis velocity vx, vy, and vz of the follower aircraft into pilot path inputs;

guiding the follower aircraft into the selected relative position by changing the direction of the follower aircraft;

determining that a path of the leader vehicle is unsafe for the follower aircraft to follow; and disengaging formation flying via the flight control computer when it is unsafe for the follower aircraft to follow the leader vehicle.

\* \* \* \* \*